United States Patent
Letrondo

[11] Patent Number: 5,959,207
[45] Date of Patent: Sep. 28, 1999

[54] STAR PATTERNED ACCELEROMETER REED

[75] Inventor: Norberto P. Letrondo, North Bend, Wash.

[73] Assignee: AlliedSignal Inc., Morristown, N.J.

[21] Appl. No.: 08/835,872

[22] Filed: Apr. 8, 1997

Related U.S. Application Data

[63] Continuation of application No. 08/515,442, Aug. 15, 1995, abandoned.

[51] Int. Cl.[6] .................................................. G01P 15/125
[52] U.S. Cl. ........................................................ 73/514.13
[58] Field of Search ........................... 73/514.12, 514.13, 73/514.21, 514.22, 514.23, 514.32, 514.36, 514.37; 361/280

[56] References Cited

U.S. PATENT DOCUMENTS

| | | | |
|---|---|---|---|
| 3,702,073 | 11/1972 | Jacobs | 73/517 |
| 4,414,848 | 11/1983 | Shutt | 73/497 |
| 4,825,335 | 4/1989 | Wilner | 361/283 |
| 4,930,042 | 5/1990 | Wiegand et al. | 73/514.13 |
| 5,085,079 | 2/1992 | Holdren | 73/517 B |
| 5,228,341 | 7/1993 | Tsuchitani | 73/517 R |
| 5,350,189 | 9/1994 | Tsuchitani et al. | 73/514.32 |
| 5,396,798 | 3/1995 | Frische | 73/517 R |

FOREIGN PATENT DOCUMENTS

| | | |
|---|---|---|
| 0 459 723 A2 | 4/1991 | European Pat. Off. . |
| 42 24 383 A1 | 1/1993 | Germany . |

*Primary Examiner*—John E. Chapman

[57] ABSTRACT

An arcuate reed for use with a capacitance type accelerometer proof mass. The reed includes grooves for improved gas damping and reduced latch-up without a reduction in damping effects.

2 Claims, 2 Drawing Sheets

STAR PATTERNED ACCELEROMETER REED

This application is a continuation of Ser. No. 08/515,442 filed Aug. 15, 1995, now abandoned.

FIELD OF THE INVENTION

The invention relates to the field of accelerometers and, more particularly to flappers or reeds used in a proof mass of an accelerometer.

BACKGROUND OF THE INVENTION

Force rebalance accelerometers which include a proof mass suspended between one or more magnet assemblies are generally known in the art. Examples of such accelerometers are disclosed in U.S. Pat. Nos. 4,182,187; 4,250,757; 4,394,405; 4,399,700; 4,400,979; 4,441,366; 4,555,944; 4,555,945; 4,592,234; 4,620,442; 4,697,455; 4,726,228; 4,932,258; 4,944,184; 5,024,089; 5,085,079; 5,090,243; 5,097,172; 5,111,694; 5,182,949; 5,203,210; 5,212,984; 5,220,831; and Re. 34,631 all of which are hereby incorporated by reference. Such force rebalance accelerometers normally include a proof mass having a reed or flapper formed from amorphous quartz, suspended by one or more flexures between stators having permanent magnets to enable the proof mass to deflect in response to forces or accelerations along a sensitive axis, generally perpendicular to the plane of the proof mass. The proof mass also typically includes at least one torquer coil secured to the reed which functions as an electromagnet. At rest, the proof mass is normally suspended equidistantly between upper and lower excitation rings. Electrically conductive material forming pick-off capacitance plates, is disposed on opposing sides of the proof mass to form capacitive elements with the excitation rings. An acceleration or force applied along the sensitive axis causes the proof mass to deflect either upwardly or downwardly which causes the distance between the pick-off capacitance plates and the upper and lower excitation rings to vary. This change in the distance between the pick-off capacitance plates and the upper and lower excitation rings causes a change in the capacitance of the capacitive elements. The difference in the capacitances of the capacitive elements is thus representative of the displacement of the proof mass along the sensitive axis. This displacement signal is applied to a servo system that includes the torquer coils which function, in combination with a current applied to the torquer coils and the permanent magnets, to return the proof mass to its null or at-rest position. The magnitude of the drive currents applied to the torquer coils, in turn, is representative of the acceleration or force along the sensitive axis.

One problem encountered in this type of accelerometer results from the use of a gas, usually a mixture of neutral gases such as helium and nitrogen, utilized to fill the accelerometer to provide gas damping for the proof mass. Under extreme acceleration conditions, it has been found that the gas damping can result in an overshoot condition when the extreme acceleration condition is removed.

In addition, it has been discovered that in certain power off situations the reed, which has a highly polished surface will have a tendency to stick or latch up to the highly polished surface of the stator thereby increasing turn on times for the accelerometer. One approach to solving this problem is described in U.S. Pat. No. 4,825,335 wherein a rectangular moveable capacitor plate, which is suspended on each side by fingers, is provided with a number of air passages extending through the plate along with grooves in the plate leading up to the air passages to facilitate the flow of air. However etching holes in the flapper of the above described accelerometer is not a practical solution to this problem.

SUMMARY OF THE INVENTION

It is therefore an object of the invention to provide for improved gas damping and reduced lock up in an accelerometer having a proof mass that includes an arcuate reed suspended by hinges for rotation between two stator members.

It is a further object of the invention to provide an arcuate reed for use with a proof mass of an accelerometer where the reed includes a number of radially extending grooves.

Another object of the invention is to provide an arcuate reed for use with a proof mass, which is suspended by a pair of flexure hinges between a pair of stators, where the reed includes radially extending grooves etched on both sides and located at approximately 45 degree intervals on the side away from the hinges. In a reed approximately 0.030 inches thick, the grooves can be 0.020 inches wide and 0.0005 inches deep.

DETAILED DESCRIPTION OF THE INVENTION

Figure 1:
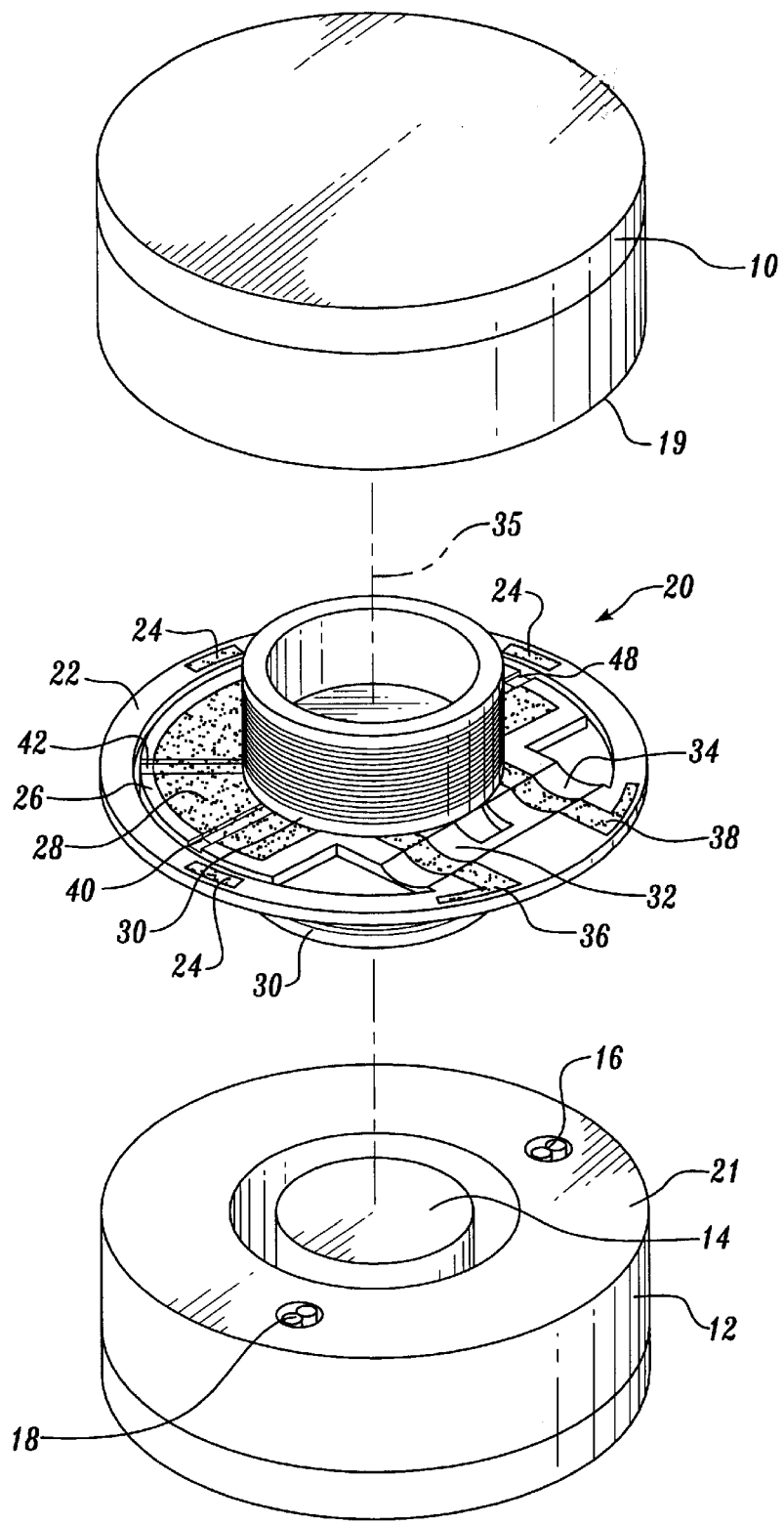
FIG. 1 is an exploded perspective view of a force rebalance accelerometer according to the invention.

FIG. 1 illustrates in an exploded view form, an acceleration transducer of the type disclosed in detail in the aforementioned U.S. Pat. No. 4,250,757. In this embodiment, for descriptive purposes, the accelerometer includes an upper magnet or stator structure 10 and a lower magnet or stator structure 12. Included in each of the upper 10 and lower 12 stator structures are permanent magnets as illustrated by a magnet 14 shown in the lower stator structure 12. In addition the lower stator structure includes support posts for electrical leads as illustrated at 16 and 18. Also shown in FIG. 1 is a movable element assembly in form of a proof mass assembly, generally indicated at 20. Included in the proof mass assembly is an outer annular support member 22 which is supported between opposed planar surfaces 19 and 21 of the upper stator structure 10 and the lower stator structure 12 by pairs of spacer elements or mounting pads 24 on the member 22. The lower pad of each pair of mounting pads is not shown in the drawing. As shown in FIG. 1 the location of each pair of mounting pads 24 is spaced apart from each other around the support ring 22. Included in the proof mass assembly 20 is a movable flapper or reed 26 extending radially inwardly from the outer support ring 22. The reed 26 and the support ring 22 are preferably etched out of a single piece of amorphous quartz. Deposited on the upper and lower surfaces of the reed 26 is an electrically conductive material 28, preferably gold and having an arcuate shape, that serves as a capacitive pick-off area or plate. The capacitive pick-off plates 28 on the upper and lower surfaces of the reed 26 cooperate with the opposed surfaces 19 and 21 of the upper and lower stator structures 10 and 12 to provide a capacitive pick-off system.

Mounted on each side of the reed 26 is a force restoring coil 30. As is well understood in the art, the force restoring or torquer coils 30 cooperate with the permanent magnets 14 to retain the reed 26 within a predetermined position with respect to the support ring 22.

The reed 26 including the force coils 30 is connected to the support ring 22 by means of a pair of flexure elements 32 and 34. The flexures 32 and 34 permit the proof mass 20 including the reed 26 and the coil 30 to move in a rotational pendulous manner with respect to the annular support ring 22. The reed 26 will move in response to forces along the sensitive axis 35 of the accelerometer. Also deposited on the support ring 22 and flexures 32 and 34 are thin film pick-off leads 36 and 38 which provide electrical connections to the capacitor plates 28 and the force coils 30.

Figure 2:
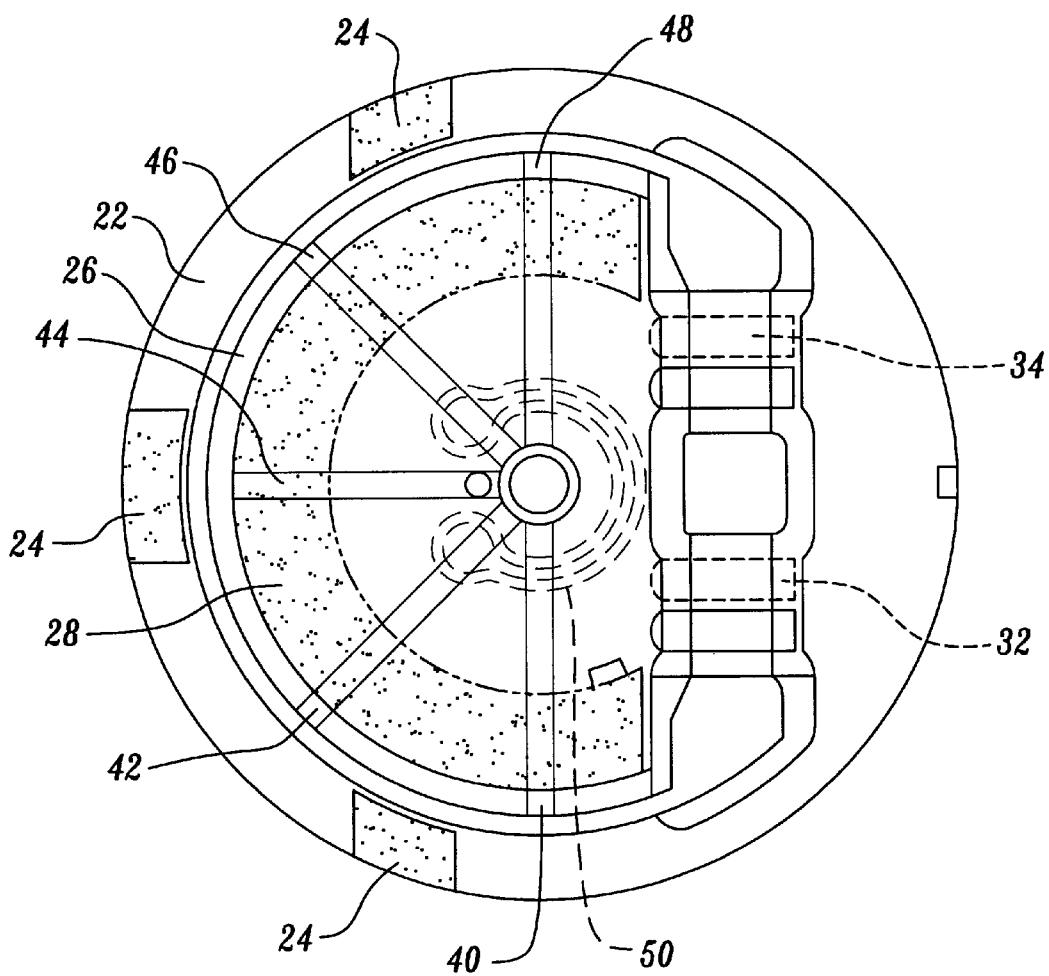
FIG. 2 is a top view of a reed having grooves for use with the accelerometer of FIG. 1.

In order to increase damping efficiency and reduce lock up, the reed 26, as shown in the top view of FIG. 2, is configured with a set of radially extending grooves 40–48 in the upper surface. The drawing of FIG. 2 omits the torquer coils 30 shown in FIG. I and illustrates a cut out area 50 on the reed 26 which permits electrical connections to the torquer coils 30. In the preferred embodiment of the invention, the five grooves 40–48 are spaced at 45 degree intervals in a star pattern on the upper surface of the half of the reed 26 which is opposite the flexures 34 and 36. Corresponding grooves (not shown) are etched in the lower surface of the reed 26. The grooves 40–48 extend radially from the cut out portion 50 to the edges of the reed 26. In the embodiment of the reed 26 shown in FIG. 2, the reed 26 is approximately 0.030 inches thick with a diameter of 0.642 inches and the grooves 40–48 etched into the reed 26 are approximately 0.020 inches wide with an approximate depth of 0.0005 inches.

I claim:

1. An accelerometer comprising:

a first and a second stator member wherein each of said stator members includes a generally planar capacitive pick-off area;

a proof mass assembly rotatably secured between said first and said second stator members by at least one flexure member wherein said proof mass includes an arcuate reed member having an upper surface and a lower surface;

at least one capacitive pick-off area deposited on at least one surface of said reed member, and a plurality of grooves configured on at least one of said surfaces of said reed member wherein said grooves are spaced apart by approximately 45 degrees on the side of said reed member away from said flexure members.

2. The accelerometer of claim 1 wherein said grooves have a width of 0.020 inches and a depth of 0.0005 inches and extend to the edge of said reed.

* * * * *